United States Patent

[11] 3,560,765

[72] Inventor James J. Kubinec
San Jose, Calif.
[21] Appl. No. 781,017
[22] Filed Dec. 4, 1968
[45] Patented Feb. 2, 1971
[73] Assignee National Semiconductor Corporation
Santa Clara, Calif.
a corporation of Delaware

[54] HIGH SPEED MOS READ-ONLY MEMORY
12 Claims, 3 Drawing Figs.

[52] U.S. Cl. .......... 307/246,
307/235, 307/237, 307/243, 307/246, 307/247, 307/251, 307/289, 307/304
[51] Int. Cl. .......... H03k 17/60
[50] Field of Search .......... 307/205, 237, 243, 246, 247, 251, 270, 279, 289, 304, 235; 317/235(22.2); 330/19, 38(FE), 38(FM)

[56] References Cited

UNITED STATES PATENTS

| | | | |
|---|---|---|---|
| 3,431,433 | 3/1969 | Ball et al. .......... | 307/247X |
| 3,434,068 | 3/1969 | Sevin .......... | 330/19 |
| 3,480,796 | 11/1969 | Polkinghorn et al. .......... | 307/304X |

*Primary Examiner*—Stanley T. Krawczewicz
*Attorney*—Harvey G. Lowhurst

ABSTRACT: A sense-amplifier for use with a read-only memory apparatus and having means for limiting to less than six volts the voltage to which the memory elements are subjected. An all FET amplifier structure is provided having an input stage which clamps the output voltage of the memory device to a predetermined potential and prevents the output of the memory from causing this potential to swing more than a predetermined value when a storage element is gated ON. The amplifier of the present invention has an input impedance which is at least 20 times smaller than similar prior art devices and thus enables a 20 to 1 or better reduction in the time constant associated with the data readout operation. As a result, substantially higher readout speeds can be obtained.

INVENTOR.
JAMES J. KUBINEC
BY
Harvey G. Lambert
ATTORNEY

HIGH SPEED MOS READ-ONLY MEMORY

BACKGROUND OF THE INVENTION

A MOS read-only memory is comprised of an array of FET devices the drain of which are connected to a common output terminal. These integrated circuit devices serve as switches which complete a current path from a source through a load connected to the output terminal when the site at which they reside is individually interrogated. The gating operation which consists of gating on the respective FETs is provided by a series of individual address lines, each of which leads to one of the storage sites and to the gate of the semiconductor device appearing there, if one is present. By applying a suitable input pulse to a given address line a current path through the output load will be completed and a voltage signal can be obtained which is responsive to the input address signal. Where an FET has not been provided at a site it will be apparent that an address signal applied to the address line which leads to that site cannot cause a current path to be completed through the load and no output signal will be obtained.

These types of memory devices are roughly equivalent to other well-known memory devices such as punch cards, paper tape, magnetic tape, etc. However, because they can be microminiaturized, they offer certain advantages over the aforementioned memory apparatus. Although any type of transistorized gating means can be used as the switching element of an integrated read-only memory device, the FET has been found to offer many advantages insofar as size, requirements, simplicity of manufacture and dependability are concerned.

The typical MOS FET read-only memory consists of an array of 1,000 or more storage sites which are appropriately interconnected during manufacture using integrated circuit processes. In order to program the storage unit, certain ones of the sites are not provided with FETs during the manufacturing process so as to produce "holes" in the array which constitute the equivalent to holes in a punched card, for example.

Typically, the signal which is obtained from the memory when a particular line is addressed is weak and subject to distortion. And the smaller the memory is made the smaller the signal must necessarily be because of the current handling capabilities of the semiconductive material out of which the memory is made. In order to reproduce the respective output signals, a sense amplifier is provided for amplifying the voltage pulses induced across the load and converting it to a usable output signal form.

There have generally been two approaches to sensing the memory output of read-only type memories of this type. One is to amplify the voltage by conventional one or two-stage amplifiers the input of which is taken across a load resistance connected to the output terminal of the memory unit. Using this method the voltage swing is quite large, on the order of 10 volts, for example, and produces a slow memory output due to the physical nature of the device. Present devices of this type have output reading times on the order of two to four microseconds.

The other approach which allows the memory to be scanned at a slightly higher rate involves a dynamic technique wherein the memory output is strobed. Using this technique, one or two additional signals are introduced to the chip via a clock line. These clock lines carry signals which are used to strobe the memory output and test it only during a particular interval of time. Using this technique an increase in the speed of operation is obtained. However, the problem with this technique is that the output information is only available for a brief interval of the clock time, i.e., it is not present during the entire address period. This makes it much harder to use in a system since the output signal is available to the system only during the brief instance of time that it is strobed. During the remaining time intervals all other information must be ignored. This is a very stringent requirement to place on most users.

SUMMARY OF THE INVENTION

The present invention relates generally to sense amplifiers for use in combination with read-only memory apparatus and more particularly to an integrated circuit MOS FET sense-amplifier apparatus which enables the required voltage handling capabilities as well as the physical size of the MOS memory to be reduced and furthermore allows the memory to be read at a considerably higher rate than has been available using prior art devices.

Briefly, the sense amplifier of the present invention is comprised of an all FET amplifying circuit which is biased so as to prevent the output voltage of the input signal from swinging more than a predetermined value between the 1 and 0 states, thus overcoming certain physical limitations of the storage device which are the result of the inherent output capacitance thereof. More specifically, this technique puts a low impedance into the output line of the memory and clamps it at a substantially constant voltage allowing it to swing only about 100 millivolts or so between the 1 and 0 states.

By utilizing the FET circuit of the present invention, the output impedance of the memory unit is made about 20 times lower than the best prior art equivalent, and thus gives an approximate 20—1 reduction in the time constant of the memory output circuit. This small output signal from the memory device also enables the physical dimensions of the storage device to be greatly reduced due to the lower voltage handling capabilities required. The small signal is easily amplified by the sense-amplifier which will be described in greater detail hereinafter.

It is therefore a principal object of the present invention to provide a novel sense-amplifier apparatus utilizing only MOS devices as components thereof so that the amplifier may be integrated on the same chip with the memory device.

Another object of the present invention is to provide a novel sense-amplifier apparatus which limits the change in voltage on the memory output to substantially less than 1 volt, and thus increases the speed at which the memory may be interrogated.

Still another object of the present invention is to provide a novel sense-amplifier apparatus which limits the voltage applied to the drain terminals of the memory devices to a value substantially less than prior art apparatus and thus enables a substantial size reduction in the memory devices.

Still another object of the present invention is to provide a combination memory-sense-amplifier structure using only FET devices such that the entire structure can be fabricated using a single diffusion process.

While the novel features which characterize this invention are pointed out with particularity in the claims annexed to and forming a part of this specification, the invention itself both as to its structure and manner of operation together with further objects and advantages thereof will best be understood upon reference to the following description taken in connection with the accompanying drawings.

IN THE DRAWING

DESCRIPTION OF THE PREFERRED EMBODIMENT

Figures 1, 2, 3:
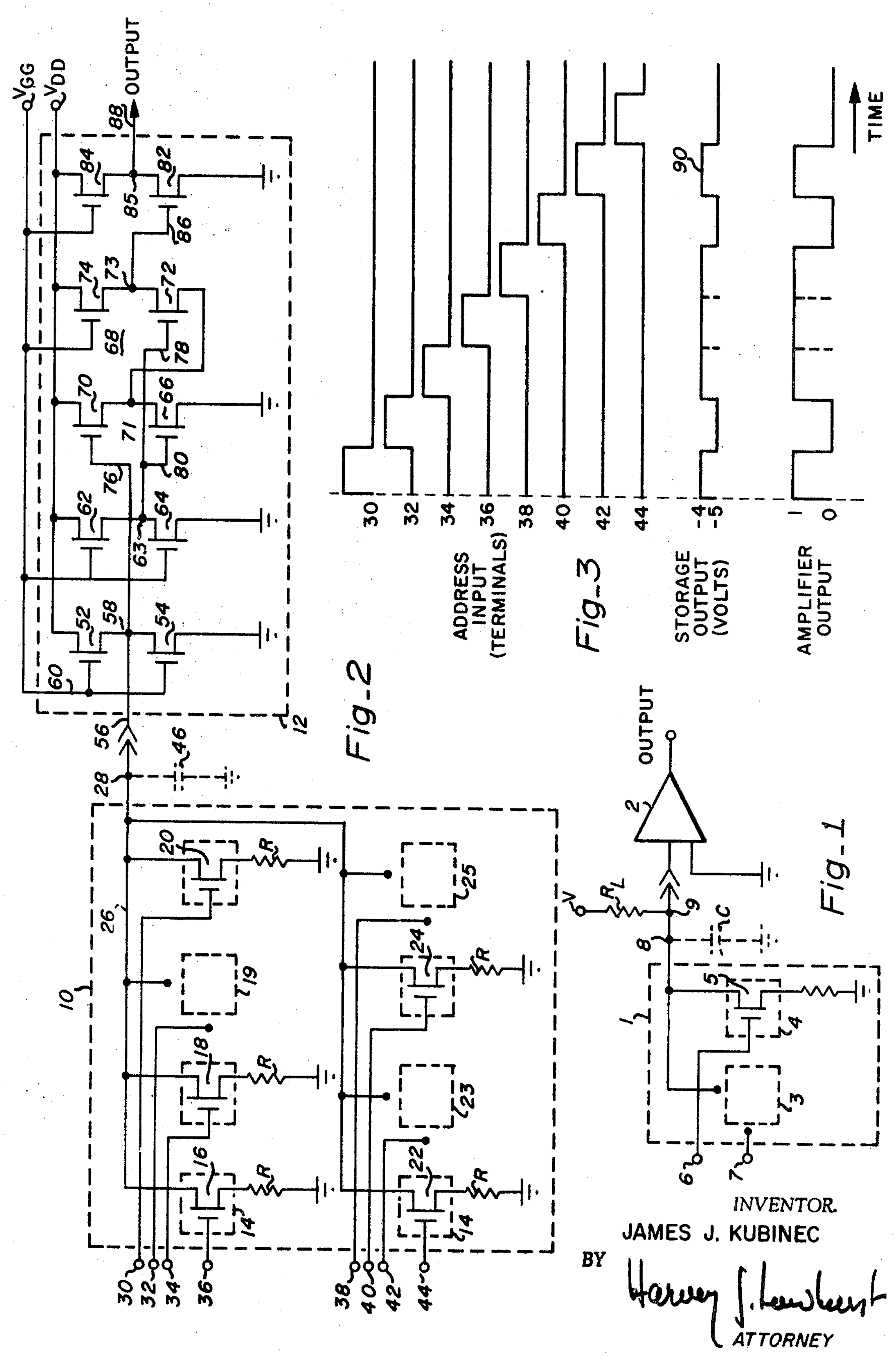
FIG. 1 is a schematic diagram illustrating a MOS read-only memory and sense-amplifier of the type used in the prior art.
FIG. 2 is a schematic diagram illustrating a MOS read-only memory and sense-amplifier in accordance with the present invention.
FIG. 3 is a timing diagram illustrating the operation of the apparatus of FIG. 1.

Referring now to FIG. 1 of the drawing, there is schematically illustrated a read-only memory device 1 and a sense-amplifier 2 which are generally illustrative of the prior art apparatus. The memory 1 includes storage sites 3 and 4, which may or may not have switching elements disposed therein depending on whether that site is intended to represent a "0" or a "1" memory state. As illustrated, site 3 has no switching element and is thus a "0" site, whereas site 4 has a switching element 5, generally illustrated in the form of an FET, and corresponds to a "1" site. The address leads 6 and 7 lead to the sites 4 and 3 respectively. Where a switching element is present, such as shown in site 4, the address lead 6 is connected to the gate of the switching device. A common output interconnect 8 is also provided to each of the sites. Whereas in site 4 an FET 5 is included, the output interconnect 8 is connected to the drain of the switching device.

A voltage supply V is connected to the output lead 8 at output terminal 9 through a load resistance means RL such that when there is no input applied to the address lead 6 or 7 the voltage appearing at terminal 9 is substantially V. However, when an address voltage is applied to terminal 6, for example, the FET 5 is rendered conductive and causes the voltage at terminal 9 to swing to substantially ground potential. The resulting voltage swing is amplified by amplifier 2 to produce an output signal corresponding to a "1" stored in the memory. When the site 3 is interrogated by supplying an address pulse to lead 7, no output results since there is no switching element in site 3 and thus no corresponding voltage swing at terminal 9. This corresponds to a "0" readout as compared to the "1" readout obtained by addressing input lead 6.

It will be noted that because the potential at output terminal 9 must swing from potential V to ground potential, the switching element 5, for example, must be capable of handling the entire voltage V. This is, of course, undesirable for at least two reasons. The first is that the switching element 5 must be physically large enough to handle a relatively high voltage, which may be as large as 10 volts or more. The second is that due to the size of the switching element 5 necessary to handle the voltage V, the parasitic capacitance of the storage array is comparatively large. When this capacitance C is combined with the large value of load resistance RL necessary to limit the current supplied to the switching element 5, there is a large time constant which necessarily limits the rate at which the storage array can be addressed.

Referring now to FIG. 2 of the drawing, there is shown at 10 a schematic illustration of a MOS FET read-only memory device, the output of which is coupled to a sense-amplifier 12 which comprises a preferred form of the present invention. The two are formed on a single semiconductive chip using a single diffusion process. The read-only memory 10 is comprised of an orderly array of data storage sites 14 which are suitably located on the semiconductive chip. In predetermined ones of the sites 14 an FET is produced, such as the FETs 16, 18, 20, 22 and 24, for example. Whereas on other sites 19, 23 and 25, no FET is produced during the manufacture of the device. Thus, the memory is said to be programmed such that the diffused sites represent "1"s and the vacant sites represent "0"s.

An interconnect network 26 is connected between the memory output terminal 28 and each of the storage sites 14.

Where an FET is disposed on a given site the interconnect provides a drain connection thereto. The source of each FET is connected to circuit ground. The parasitic resistances R of each FET is schematically shown between the source of each FET and ground. A plurality of address interconnects 30 through 44 lead respectively to each of the storage sites 14 and where an FET is present at the site 14 the address interconnect is operatively connected to the gate electrode thereof. Where no FET is present, the interconnect is merely open circuited at the site, such as is illustrated at sites 19, 23 and 25. The parasitic capacitance of the storage device which appears in the aggregate at the output 28 is illustrated at 46.

Sense-amplifier 12 is comprised entirely of FET devices and includes as the input stage thereof a pair of FETs 52 and 54 connected in series between a potential supply VDD and ground. The amplifier input 56 which is connected to the output lead 28 of the memory device 10 is also connected to a point 58 between the drain of FET 54 and the source of FET 52. The gates of both FET 52 and 54 are connected to a common potential supply, VGG, by a lead 60 and are normally biased ON. VGG is typically at −24 volts below circuit ground. VDD is typically at about −12 volts below circuit ground, thus providing at point 58 a relatively low voltage of about −5 volts for application to the memory bank 10.

A similar set of series connected FETs 62 and 64 are provided for supplying a gate voltage to another FET 66, which serves as a current source for the differential amplifier 68 which is comprised of an FET 70 connected in parallel with another FET 72 and serves as a load impedance for the amplifier 68. The gate 76 of FET 70 is connected directly to point 58 which is the circuit input. The gate 78 of the FET 72 is connected to the reference potential which is provided at point 63 at the drain of FET 64. The gate 80 of current source FET 66 is likewise connected to the same point.

An additional amplifying stage comprised of the series combination of FET 82 and FET 84 is also provided. FET 82 serves as an amplifier responsive to the output of the differential amplifier 68, and FET 84 serves as the load impedance for the FET 82. The output of the circuit is taken across the drain of FET 82.

Since both the memory array 10 and the sense-amplifier 12 are comprised solely of FET devices which can be manufactured using a single diffusion process, they can be made on a single chip to form an interval memory and sense-amplifying combination. Although the memory array 10 is shown for illustrative purposes as having only eight FET storage sites each of which correspond to a data storage bit, the actual number of data storage bits possible are typically in excess of 1,000.

In operation, the address lines 30 through 44 are sequentially supplied with a pulse of voltage so as to interrogate each of the sites 14 in sequence. Each time a pulse is applied to one of the address lines which leads to a site having an FET disposed therein, a current path is provided between the potential supply source VDD and ground through FET 52 which acts as a load impedance. Because of the voltage dividing nature of the FETs 52 and 54, the maximum voltage to which the storage FETs may be subjected is limited to approximately 5 volts. However, because the parasitic impedance R of each storage FET is larger than the impedance of the divider FET 54 and when actuated effectively in parallel therewith, the circuit point 58 is not allowed to go to ground, but is only allowed to swing in the neighborhood of 100 millivolts or so.

Since the memory cells are thus effectively subject to only 5 volts or so, the respective cells can be made much smaller than in conventional storage devices which are typically subjected to at least 10 volts during readout. Likewise, the spacing between the respective cells can also be reduced. The obvious advantage of this feature is that more memory cells can be packed into a given space on a semiconductor chip or conversely, a given size memory can be made smaller.

As an additional bonus in consequence of the reduction in size, the parasitic capacity of the storage array is reduced to yield a lower time constant and permit faster memory interrogation. The effect, then, of the divider comprised of FETs 52 and 54 is to, in the first approximation, clamp the point 58 at a substantially constant voltage. As a result the address voltage applied to the gate of a storage FET such as 16, for example, will not permit the memory output to swing to ground but will limit the swing to perhaps 100 millivolts or so. One can readily see that it will take considerably less energy to swing this 100 millivolt potential than it does to swing the 10 volts of the prior art apparatus.

Under normal conditions with no address input into the storage array 10, the differential amplifier 68 is prebiased by the voltages at points 58 and 63 respectively so that FET 70 is normally turned ON and FET 72 is normally turned OFF. This is because by design the point 58 normally maintained about 100 millivolts higher in potential than the reference potential at point 63. With the FET 72 turned OFF, its drain voltage will be at the supply value VDD. Thus, the gate 86 of amplifier FET 82 is maintained at VDD so that 82 is turned ON and the output is at ground potential and is equivalent to "0" output.

But when an address pulse is provided to address line 30, for example, which causes storage FET 20 to be turned ON, a voltage swing is caused at point 58 which turns OFF FET 70. As FET 70 is turned OFF the potential at point 71 attempts to go to ground, thus causing FET 72 to be turned ON to reduce the potential at point 73 to less than the turn-on potential required at the gate 86 of FET 82. FET 82 is thus turned OFF allowing the potential at point 85 to approach VDD and provide a "1" output pulse in response to the address pulse at terminal 30.

Upon removing the address pulse from the address line 30, the point 58 is allowed to return to its quiescent potential which turns FET 70 back ON and causes FET 72 to be again turned OFF, in turn causing FET 82 to be turned ON so as to again produce a "0" output level. Should the next address be made to a line such as 32 which leads to a site such as 19 having no FET present in the memory, no voltage swing is produced at point 58 and the system output in response to the address signal is "0".

Upon applying the next address pulse to line 34, which leads to site 18 which has a switching element present, the FET 18 is turned ON and in the manner described above a voltage pulse is caused to appear at the output terminal 88 as "1" output. This sequence may be continued until the entire memory array is interrogated or any portion thereof may be selectively interrogated so as to reproduce at output 88 the information stored therein.

In order to illustrate the complete interrogation of the memory 10 reference is made to FIG. 2 of the drawing. As an address potential is sequentially applied to each of the address inputs 30 through 44 in time sequence, a storage output pulse train 90 is produced at terminal 28 which is sensed by amplifier 12 to produce the "1—0" output 92 shown in the lower portion of FIG. 3. The data stored in the memory would therefore correspond to a series of bits having the form 10111010.

After having read the above disclosure it will be apparent to those of skill in the art that many alterations and modifications of the disclosed apparatus can be made without departing from the merits of the invention. It is therefore intended that this description be recognized as being illustrative of only one preferred embodiment of the invention. I, therefore, intend that the appended claims be interpreted as covering all modifications and all alterations thereof which fall within the true spirit and scope of the invention.

I claim:

1. A sense-amplifier means for an MOS memory apparatus comprising:
   - input terminal means and output terminal means, said input terminal means being adapted for connection to the output of an MOS memory apparatus, said output terminal means being adapted for connection to a data utilization apparatus;
   - first potential supply means and second potential supply means;
   - first FET means having its source connected to said input terminal means and its drain connected to said first potential supply means;
   - second FET means having its drain connected to said input terminal means and its source connected to said second potential supply means, said first and second FET means being biased to cause said input terminal means to normally assume a predetermined quiescent potential; and
   - bistable circuit means connected between said input terminal means and said output terminal means, said bistable circuit means being biased so as to provide an output of one state when the potential of said input terminal means is at said quiescent potential and to provide an output of another state in response to a change in potential at said input terminal means.

2. A sense-amplifier means for an MOS memory apparatus as recited in claim 1 and further including reference potential supply means for providing a reference potential different from said quiescent potential, said bistable circuit means including a differential amplifier means comprised of a third FET means and a fourth FET means connected in parallel between said first potential supply means and said second potential supply means, the gate of said third FET means being connected to said input terminal means so as to bias said third FET means normally ON in response to said quiescent potential, said fourth FET means having its gate connected to said reference potential supply means for biasing said fourth FET means normally OFF.

3. A sense-amplifier means for an MOS memory apparatus as recited in claim 2 wherein said reference potential supply means includes a fifth FET means and a sixth FET means, said reference potential being obtained from the drain of said fifth FET means the source of which is connected to said second potential supply means and the drain of which is connected through said sixth FET means to said first potential supply means.

4. A sense-amplifier means for an MOS memory apparatus as recited in claim 3 wherein a seventh FET means is provided for use as a current source for said differential amplifier means, said seventh FET means having its source connected to said second potential supply means, its drain connected to the sources of said third and fourth FET means, and its gate connected to said reference potential supply means.

5. A sense-amplifier means for an MOS memory apparatus as recited in claim 4 wherein said differential amplifier means further includes an eighth FET means having its source connected to the drain of said fourth FET means and its drain connected to said first potential supply means, said eighth FET means serving as a load means across which the output of said sense-amplifier means is taken.

6. A sense-amplifier means for an MOS memory apparatus as recited in claim 5 and further including another amplifying stage comprised of a ninth FET means, the drain of said ninth FET means being connected to said output terminal means.

7. An integrated MOS memory and sense-amplifier apparatus formed of a plurality of MOS FET devices disposed on a single chip of semiconductive material, said apparatus comprising:
   - first potential supply means and second potential supply means;
   - common terminal means and a plurality of address terminals;
   - a plurality of storage FETs having their sources connected to said first potential supply means and their drains connected to said common terminal means, the gates of said storage FETs being individually connected to ones of said address terminals;
   - first and second FET means, said common terminal means being connected to the source of said first FET means, the drain of said first FET means being connected to said second potential supply means, said common terminal means being also connected to the drain of said second FET means the source of which is connected to said first potential supply means; and
   - bistable circuit means having an input connected to said common terminal means, said bistable circuit means being biased to operate in one state when no address signal is applied to any of said address terminals and to switch to another state when an address signal is applied to one of said address terminals.

8. An integrated MOS memory and sense-amplifier apparatus as recited in claim 7 wherein said bistable circuit means includes a reference potential supply means and a differential amplifier means comprised of a third FET means and a fourth FET means connected in parallel between said first potential supply means and said second potential supply means, the gate of said third FET means being connected to said common terminal means, said third FET means being biased normally ON but the quiescent potential at said common terminal means, said fourth FET means having its gate connected to said reference potential supply means, said reference potential supply means having a potential different from the quiescent potential at said common terminal means for biasing said fourth FET means normally OFF.

9. An integrated MOS memory and sense-amplifier apparatus as recited in claim 8 wherein said reference potential supply means includes a fifth and a sixth FET means, the reference potential being obtained from the drain of said fifth FET means the source of which is connected to said first potential supply means and the drain of which is connected through said sixth FET means to said second potential supply means.

10. An integrated MOS memory and sense-amplifier apparatus as recited in claim 9 wherein a seventh FET means is provided for use as a current source for said differential amplifier means, said seventh FET means having its source connected to said first potential supply means, its drain connected to the sources of said third and fourth FET means, and its gage connected to said reference potential supply means.

11. An integrated MOS memory and sense-amplifier apparatus as recited in claim 10 wherein said differential amplifier means further includes an eighth FET means having its source connected to the drain of said fourth FET means and its drain connected to said second potential supply means, said eighth FET means serving as a load means across which the output of said differential amplifier means is taken.

12. An integrated MOS and sense-amplifier apparatus as recited in claim 11 and further including another amplifying stage comprised of a ninth FET means and a tenth FET means serially connected together between said second potential supply means and said first potential supply means, the output of said differential amplifier means being connected to the gate of said ninth FET means, the output of said sense-amplifier apparatus being taken from the drain of said ninth FET means.